United States Patent [19]
Strobl
[11] Patent Number: 4,764,700
[45] Date of Patent: * Aug. 16, 1988

[54] ARMATURE INCLUDING INTEGRAL COOLING MEANS

[75] Inventor: Georg Strobl, Repulse Bay, Hong Kong

[73] Assignee: Johnson Electric Industrial Manufactory Ltd., Chaiwan, Hong Kong

[ * ] Notice: The portion of the term of this patent subsequent to Apr. 22, 2003 has been disclaimed.

[21] Appl. No.: 940,374

[22] Filed: Dec. 11, 1986

Related U.S. Application Data

[63] Continuation-in-part of Ser. No. 837,301, Mar. 7, 1986, Pat. No. 4,656,380, which is a continuation-in-part of Ser. No. 690,761, Jan. 11, 1985, Pat. No. 4,584,498, which is a continuation-in-part of Ser. No. 526,152, Aug. 24, 1983, abandoned.

[30] Foreign Application Priority Data

Oct. 11, 1982 [GB] United Kingdom ................. 8228952

[51] Int. Cl.[4] ............................................. H02K 13/04
[52] U.S. Cl. .................................... 310/236; 310/227; 310/71
[58] Field of Search ................... 310/52, 58, 60 R, 62, 310/63, 71, 227, 232–237

[56] References Cited

U.S. PATENT DOCUMENTS

| | | | |
|---|---|---|---|
| 287,514 | 10/1883 | Edison | 310/227 |
| 1,137,510 | 4/1915 | Mattman | 310/227 |
| 2,624,855 | 1/1953 | Gayer | 310/227 X |
| 3,937,993 | 2/1976 | Noodleman | 310/227 X |
| 4,584,498 | 4/1986 | Strobl | 310/236 |
| 4,656,380 | 4/1987 | Stobl | 310/236 |

*Primary Examiner*—Mark O. Budd
*Attorney, Agent, or Firm*—Fleit, Jacobson, Cohn & Price

[57] ABSTRACT

There is disclosed an armature for an electric motor having an armature winding electrically connected to the armature commutator. The armature also has three or more housings in which portions of the armature winding are located and the connection includes terminals having a configuration for establishing and maintaining electrical contact between a terminal and a winding portion while retaining the terminal and the winding portion within a housing. The housings are in the form of radial projections which present side surfaces that act to centrifuge air outwardly to cause air to be drawn over and cool the commutator.

18 Claims, 7 Drawing Sheets

ARMATURE INCLUDING INTEGRAL COOLING MEANS

BACKGROUND OF THE INVENTION

This application is a continuation-in-part of U.S. patent application Ser. No. 837,301, filed Mar. 7, 1986, now U.S. Pat. No. 4,656,380 which, in turn, is a continuation-in-part of U.S. patent application Ser. No. 690,761, filed Jan. 11, 1985, and patented on Apr. 22, 1986, as U.S. Pat. No. 4,584,498, which, in turn, is a continuation-in-part of U.S. patent application Ser. No. 528,152, filed Aug. 24, 1983, now abandoned.

1. Field of the Invention

The present invention relates to an armature for an electric motor which includes an integral cooling means in the form of a centrifugal cooling fan.

2. Description of the Prior Art

In the manufacture of an armature for an electric motor, electrical connection is made between the armature winding and the commutator. A number of known methods for effecting such connections are in popular use. Where the winding is formed of low temperature wire it is usual to employ a soft solder and flux method or alternatively a cold crimp to effect a connection to wire after it has been stripped of insulation. When dealing with high temperature wires, it is necessary to apply heat, and also possibly to apply flux to the bore magnetic wire. Typical methods are hot forging, electric welding and gas welding. Occasionally, such welding is undertaken in combination with sophisticated inert gas shrouds in order to minimize oxidation.

However, there are a number of inherent problems and undesirable side effects associated with all of the foregoing methods.

Heat causes embrittlement of the copper wire which is used for most armature windings and encourages rapid oxidation. The use of heat also demands a strong structure to support the commutator in order to minimize plastic distortion during soldering, forging or welding. This requirement usually demands the use of high temperature compression grade molding resins. A further common problem is caused by the accidental stripping of insulation during winding of an armature which is often automated. As the wire passes over the metal of the commutator damage can be caused to the wire insulation and such damage will often be manifest as a short circuited winding.

Additionally, there is always a danger of slack in the winding wire causing fretting under the acceleration during centrifugal and inertial forces.

These disadvantages place considerable limitations to the design and manufacture of commutators especially when the factors are closely cost controlled.

A further problem, is that when operating the electric motor, an excessive build up of heat can occur in the region of the armature where the commutator and commutator connections are located which may lead to break-down or failure.

SUMMARY OF THE INVENTION

With a view to mitigating the above disadvantages the present invention provides, in the first aspect, an armature for an electric motor, having a connection between an armature winding and a commutator, wherein the armature comprises a molded part for mounting the commutator and for providing structure to coact with the commutator to establish and maintain electrical contact between the armature windings and the commutator.

It will be appreciated that the present invention provides a connection between the armature winding and armature termination which avoids the application of heat to effect the connection. The terminal of the termination can be provided with a configuration which severs insulation provided on the winding portion so as to establish electrical contact between the wire and the terminal automatically.

The manufacturers of rotating, dynamic and static electrical machinery have, since the early 1970's, utilized insulation displacement connectors. The principle of insulation displacement connection is that a wire having an insulating cover is forced into a slot narrower than the wire diameter, thereby displacing the insulation and forming a clear metal-to-metal contact between the wire and the terminal.

The present invention is concerned with the connection between an armature winding and an armature termination which includes a development of the insulation displacement connection principle. In the present invention the terminal is passed over the wire which is held stationary. The provision of a unitary armature termination and the terminal and the ensuing benefits in assembling the armature are particularly advantageous.

The shape and geometry of the housing is such that a centrifugal cooling means is integrally formed by the housing that acts as a centrifugal fan to cool the region of the armature winding termination and the commutator.

BRIEF DESCRIPTION OF THE DRAWINGS

Embodiments of the present invention will now be described by way of example only and with reference to the accompanying drawings, in which.

DESCRIPTION OF THE PREFERRED EMBODIMENTS

FIGS. 1 to 6 illustrate one embodiment of the invention in which the centrifugal cooling means is in the form of a centrifugal cooling fan, the blades of which are integrally made as the side faces of the housings which serve as part of the armature termination. In this embodiment, the commutator having five segments, five connections to the armature winding are required and therefore, a centrifugal cooling structure is developed that has five blades or working surfaces, in each direction of rotation of the armature.

Figure 1:
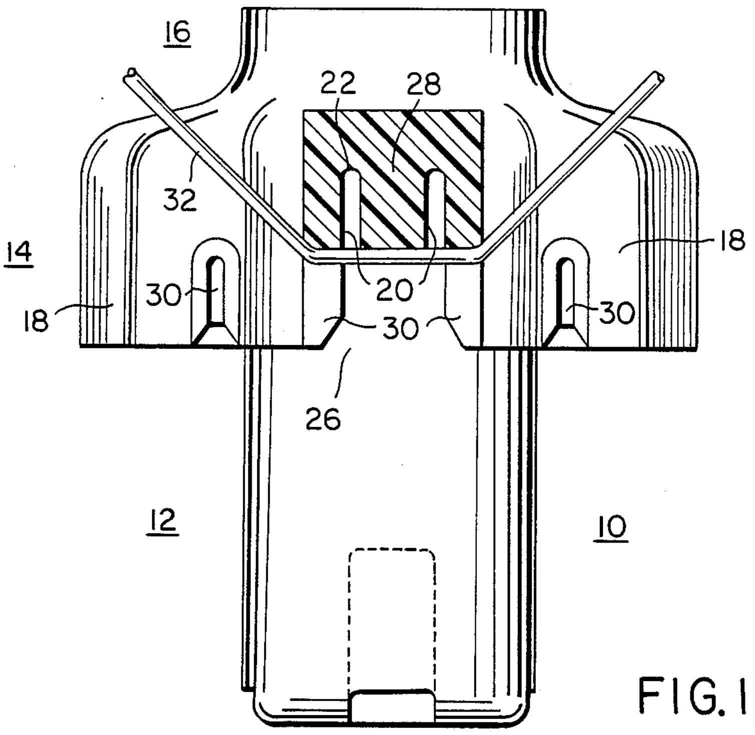
FIG. 1 shows in plan view a body forming part of the armature and is partially sectioned to illustrate the configuration of one of the connection housings and the geometry that produces the centrifugal cooling means.

FIG. 1 shows a unitary plastic molded body 10. The body 10 has three sections, 12, 14, and 16, and is essentially a hollow cylinder with additional structures provided on its external surface, in its middle section 14. The shaft of an armature (not shown) passes through and is fixed to the body 10 in any known fashion such as press fitting, and the portion 16 is a spacer which spaces the middle section 14 of the body 10 from the base of the armature stacks and windings (not shown) but of conventional structure.

The middle portion 14 of the body 10 has five housings 18 equally spaced around the circumference of the body 10. Each of the housings 18 is essentially of rectangular cross section viewed in a plane normal to the axis of body 10. Each housing has side faces 18*a* and 18*b* which serve as blades or working surfaces to move air radially outwardly relative to the axis of body 10 when body 10 is rotated as part of the assembled armature. Each housing 18 also is used in effecting connection between a respective portion of the armature winding and one of the commutator segments.

Section 12 of the body 10 provides support for the commutator segments.

Three of the five housings 18 are shown in FIG. 1. Each housing 18 has side walls 20, and end or rear wall 22 and a top wall 24. Side faces 18*a* and 18*b* are the outer surfaces of side walls 20. Each housing 18 has an opening 26 which faces the commutator support 12 and is defined by the walls 20, 22 and 24. The side walls 20 are parallel with the longitudinal axis of the body but transversely displaced by one-half the width of the housing 18. The end wall 22 is adjacent and flairs into the spacer section 16.

A boss 28 projects centrally from the internal surfaces of the end wall 22 and extends within the housing 18 for approximately half the length of the side walls 20. The boss 28 extends parallel with the longitudinal axis of the body 10 and is formed integral with the end wall 22. Each side wall 20 of the housing 18 has a slot 30 which extends parallel to the longitudinal axis of the body 10, from the opening 26 at the commutator end of the housing 18 for a length which terminates at the level of the free end of the boss 28. A wire 32 of an armature winding is passed through the slots 30 of each of the housings 18 and the winding 32 rests on the end of the boss 28. The external surfaces of the side walls 20 are bevelled to facilitate entry of the winding portion 32 into the slots.

Figure 2:
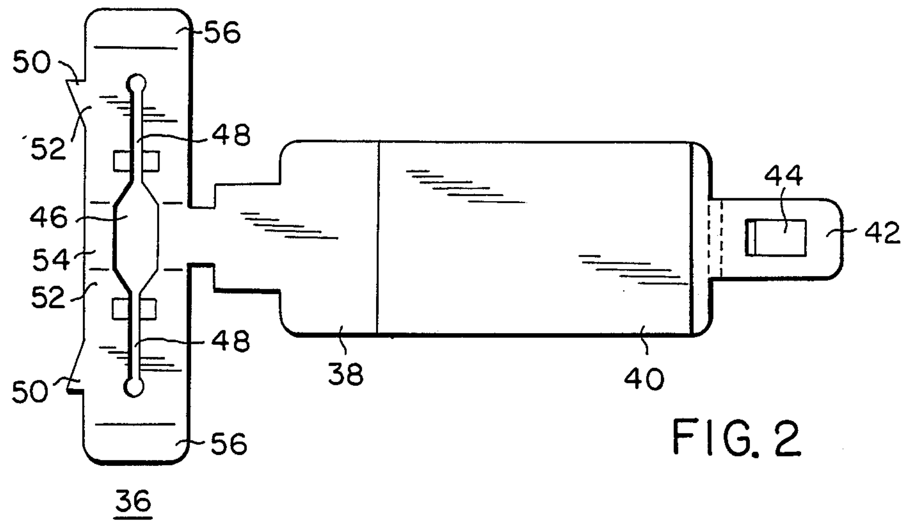
FIG. 2 is a plan view of an armature termination and terminal in blank form.
Figure 3:
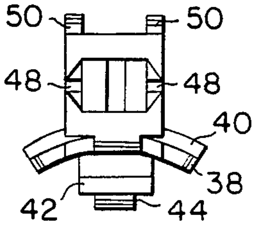
FIG. 3 is an end elevation of the termination and terminal of FIG. 2 showing the operational configuration of the termination and terminal.

The combined commutator segment 34 and terminal 36 are illustrated in FIGS. 2 and 3. FIG. 2 shows the combination in the form of a blank and FIG. 3 is an end elevation of the combination when formed into its operational configuration. The commutator segment 34 has a base 38 which carries an overlay j40. A lug 42 of reduced width is provided at the front end of the base 38 and the lug 42 has a central struck-up tag 44.

At its rear end, the base 38 of the commutator segment 34 is connected to the terminal 36. The terminal 36 is rectangular with its minor axis coincident with the longitudinal axis of the commutator segment 34. The terminal 36 has a central cut out portion 46 which is symmetrical with respect to both the major and minor axis of the terminal 36. The cut out 46 reduces from its largest width at the center of the terminal to two key hole shaped portions 48 which terminate either end of the cut out 46. A triangular barb 50 is provided on either side of the minor axis of the terminal 36 along the edge furthest from the commutator segment 34.

As can be seen from FIG. 3, the base 38 and the overlay 40 of the commutator segment 34 are of arcuate form which conforms to the external radius of the commutator support section 12 of the body 10. The lug 42 extends below the base 38 and back along the length of the commutator section 34 with the tag 44 projecting below the lug 42. Terminal 36 is bent upright from the commutator segment 34 and the arms 52 of the terminal 36, which include the respective key hole formations 48, are bent at 90° to the central portion 54 of the terminal. The arms 52 therefore extend parallel to each other and to the longitudinal axis of the commutator segment 34, and forward along the length thereof. The free ends 56 of the terminal 36 are bent so as to extend towards each other when the arms 52 have been bent parallel to each other.

Figure 4:
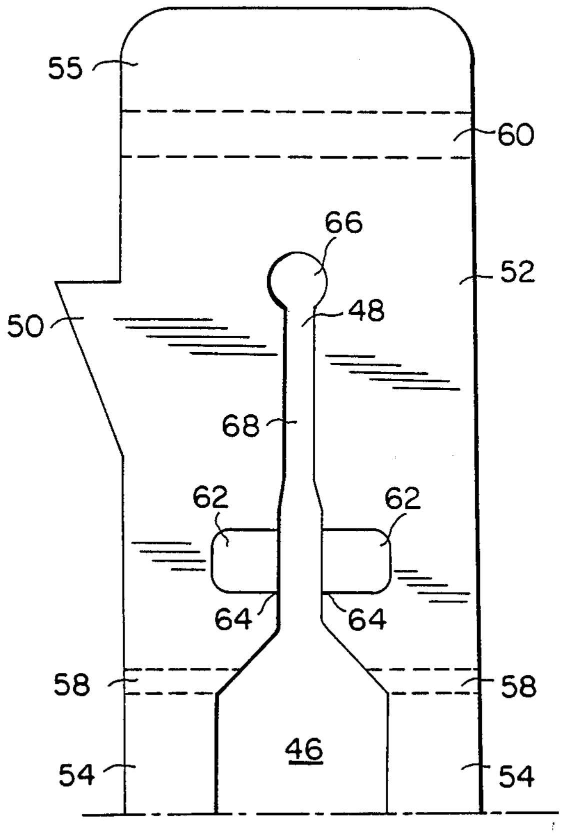
FIG. 4 is an enlarged view of one portion of the terminal shown in FIG. 2.

FIG. 4 shows one half of the terminal 36 of FIG. 2, on an enlarged scale. Areas 58 are shown in which bending occurs between the central portion 54 and the arm 52. Area 60 is also indicated in which bending between the arm 52 and the extreme portion 56 occurs. However, the main purpose of FIG. 4 is to illustrate the detailed structure of the key hole cut out section or slot 48. It is this feature which ensures contact with the armature winding portion 32. The reduction in size from the center of the cut portion 46 to the start of the slot 48 provides a funnel for guiding one arm 52 onto the winding portion 32. A short distance into the slot 48 there are located two cutters 62 which have sharp edges 64 projecting into the slot 48. The cutters 62 are formed from the arm 52 but extend partially therefrom such that the sharp edges 64 project into the slot 48. The cutters 62 are formed from the arm 52 but extend partially therefrom such that the sharp edges 64 project into the slot 48. Along the slot 48, behind the cutters 62, there is a first divergent portion 74 of the slot 48 followed by a convergent portion. This ensures that where there are two wires 32 mounted in a housing recess 26, constituting the opposite ends of the armature winding, the first wire 32 to be cut by the sharp edges 64 moves into the first divergent portion 74 of the slot 48 before the second wire 32 is presented to the cutters 62 so that the sharp edges 64 are allowed to close up to cut the insulation on the second wire 32 sufficiently deep. Circular end 66 of cut out 48 ensured that the edges of the cut out 48 have a certain resilience to separation by the armature portion 32.

Figure 5:
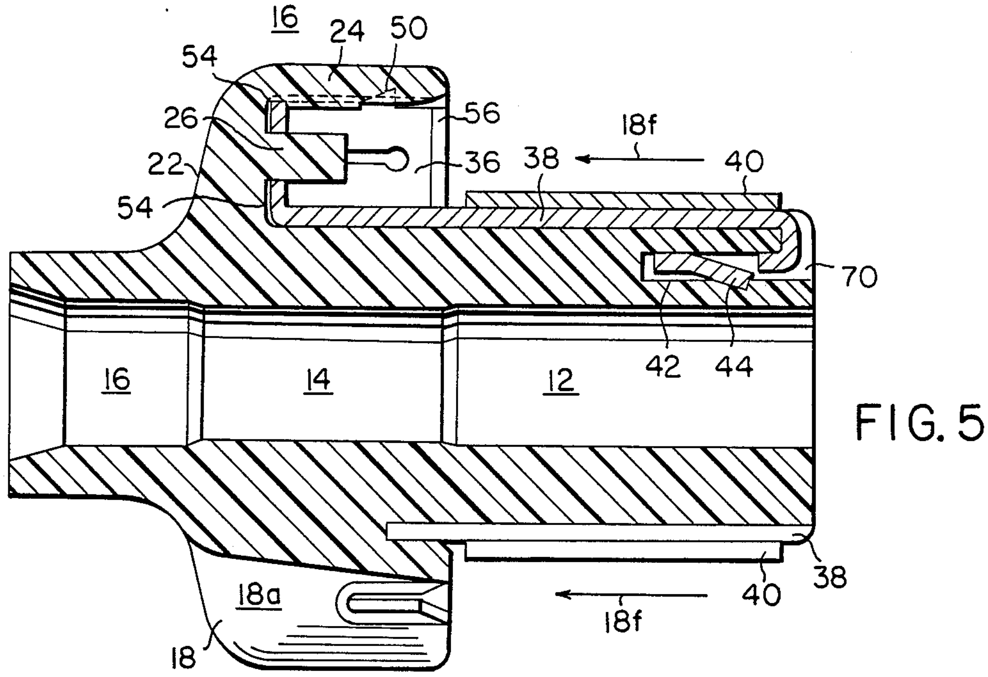
FIG. 5 is a vertical sectional view of the body of FIG. 1 showing the termination and terminal of FIGS. 2, 3, and 4 when attached to the body and the geometry that produces the centrifugal cooling means.

FIG. 5 is a vertical section through the body 10. FIG. 5 shows shaped commutator segment 34 and the terminal 35 in position on the body 10. The terminal 36 enters the housing 18 and the central portion 54 of the terminal 36 passes over the boss 28. The winding portion 32 is guided into the key hole cut out 48. As the terminal 36 passes over the wire 32 the sharp edges 64 of the cutters 62 sever the insulation on the wire 32 and further entry of the terminal 36 forces the wire 32 into the narrower portion 68 of cut out 48.

The slight resilience provided by circular portion 66 and the relative sizes to the wire and the section 68 ensure that the arm 52 continues to bear against the wire 32 with a residual spring tension which maintains high contact pressure ensuring a reliable long term connection.

The barbs 50 grip the cover 24 of the housing 18 and therefore retain the terminal 36 within the housing 18. Additional retention may be provided by contact between the central portion 54 of the terminal 36 and the boss 28. The arms 52 of the terminal 36 can be bent at an angle slightly less than 90° from the central portion 54 so as to provide retention of the terminal 36 by action against the side wall 20 of the housing 18. Further retention is provided if the width of the terminal 36 is a close fit to the internal dimensions of the housing 18.

The front end of the body 10 is provided with five longitudinal recesses 70 which are cut away at the forward ends so as to seat the curved external surface of the commutator supporting section 12. Lug 42 of commutator segment 34 enters the recess 70 as the terminal 36 enters the housing 18. Tag 44 of lug 42 is forced into the material of the body 10 so as to rigidly restrain the lug 42 within recess 70. Commutator segment 34 is rigidly held in position on the supporting section 12 by interaction of lug 42 and tag 44 with recess 70 at its other end. The commutator segment 34 is rigidly held on supporting section 12 and there is no fear of displacement even during high rotational accelerations.

Description will now be given of the assembly of an electric motor incorporating the present invention.

It will be seen that assembly is greatly facilitated and the commutator segment 34 is particularly suitable for inclusion in an automated process of manufacture. The body 10 is placed on the armature shaft with the spacer 16 against the base of the lamination stack. The lead wire of the armature winding is inserted into the housing 18 by laying the end of the wire 32 in the slots 30 provided in the side wall 20 of the housing 18. The wire 32 is drawn back into the housing 18 until it rests against the boss 28. From this start, the first armature coil is wound. At the end of the first coil winding the armature is indexed and the wire 32 is layed in the same manner in the next housing 18 without breaking the continuity of the wire 32.

The process is repeated until all coils have been wound and the tail end of the winding is then laid in the slot 30 of the first housing 18 and pushed back until it is adjacent to the lead end which was placed against the boss 28 at the beginning of the winding operation. The wire 32 is then cut and the armature removed from the winding machine.

The body 10 now has a winding portion 32 comprising insulated wire laying in each of the housings 18. Each of the winding portions 32 is under tension and is pulled tight against the respective boss 28.

The combined commutator segment 34 and terminal 36 are prepared ready for insertion into the body 10. The commutator segment 34 and terminal 36 are provided in blank form as shown in FIG. 2. The commutator segment 34 consists of a bimetallic strip one layer of which constitutes the overlay 40. The material of the base 38 is brass or other metal having similar properties for providing the resilience required for the terminal 36 and lug 42. The overlay 40 is formed of copper which provides the properties necessary for its commutation function. In operation, the overlay 40 will be directly contacted by the brushes of the electric motor.

The commutator segments 34 are placed on the supporting section 12 of body 10 and are slid along the section 12 so that the terminals 36 enter respective housings 18 and the lugs 42 enter the respective recesses 70.

As the terminal 36 approaches the winding portion 32 held in the housing 18, the slots provided by cut outs 48 move over the wire 32. The sharp edges 64 of the cutters 62 sever the insulation on the wire 32 which is deformed a the slots, formed by cut outs 48, move over the wire 32. Intimate metal to metal contact is thereby provided between the wire 32 and the terminal 36. The arms 52 of the terminal 36 act as double cantilever springs and exert a continuous pressure on the wire 32.

The present invention provides a simple and inexpensive connection between the armature winding and the commutator. No application of heat is required and the associated risk of distorting the body 10 is therefore avoided. No embrittlement of the winding wire is caused and problems associated with oxidation are also avoided. The use of flux is negated and there is no chemical reaction or consequent corrosion resulting from the connection. The armature winding is a single continuous winding and the danger of introducing slack by breaking the winding to effect a connection to each coil is completely avoided. Consequently, the danger of the armature winding being fretted when the motor is in operation, is significantly reduced. It should also be noted that the commutator segments 34 are introduced after the winding of the armature has been completed and therefore the danger of the wire being accidently stripped by abrasion on metal components during winding is very greatly reduced.

Figure 6:
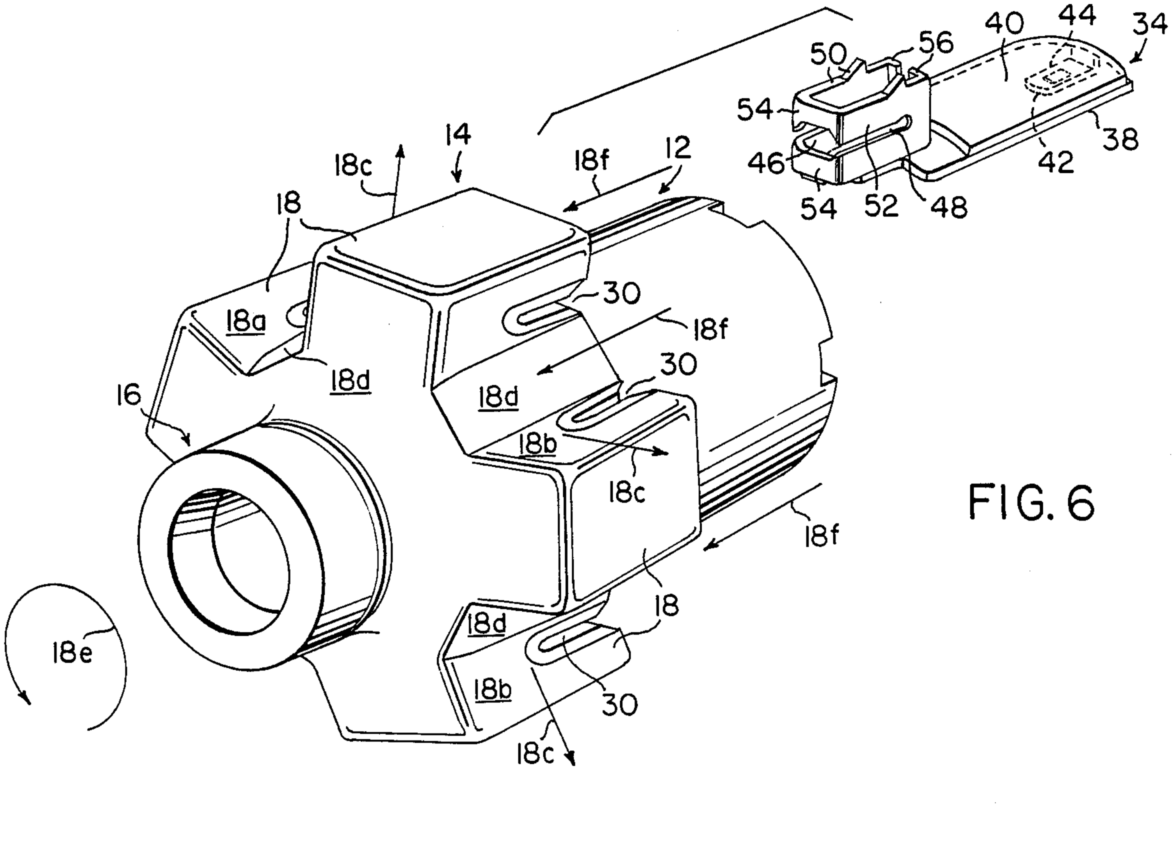
FIG. 6 is an exploded isometric view of the body 10 with respect to a combined commutator segment and terminal of FIGS. 2, 3, and 4 prior to insertion into the body and illustrates the shape and geometry that produces the centrifugal cooling means.

The side faces 18*a* and 18*b* provide the working surfaces or blades of a centrifugal cooling fan when the body 10 is rotated. As shown in FIGS. 5 and 6, when body 10 is rotated, sides 18*a* or 18*b*, depending upon the direction of rotation, e.g., see arrow 18*e*, will centrifuge air radially outwardly as shown by arrow 18*c*, causing a low pressure zone to appear at the sections of the housings 18 where they join the main body 10, see reference numeral 18*d*. This will cause air to move over the commutator, see arrows 18*f*, into the low pressure zones 18*d* and thus, create a continuous motion of air which will have a cooling effect on the commutator surface to prevent any undue heating of the brushes (not shown) and commutator contacts.

Figure 7:
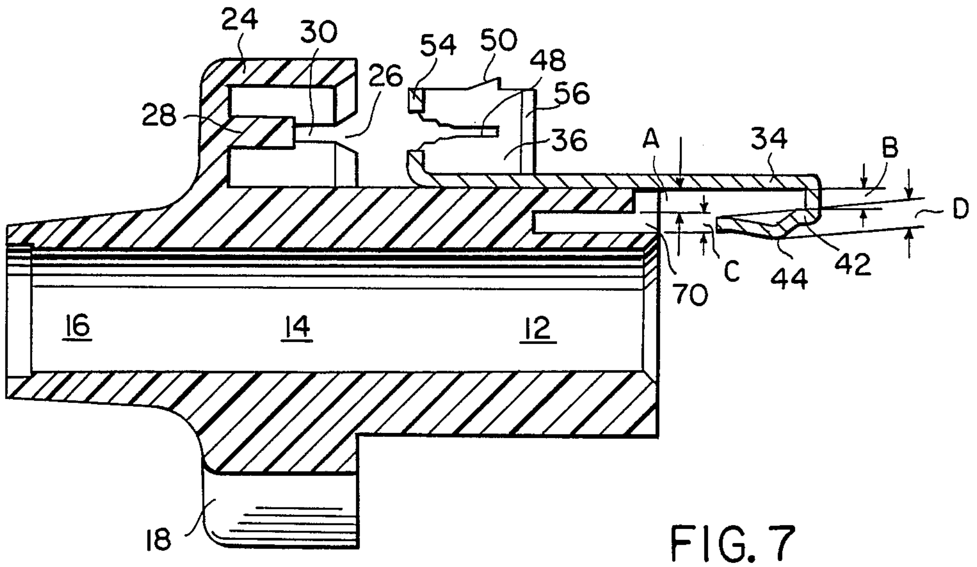
FIG. 7 is a sectional side view of an armature body similar to that shown in FIG. 1 showing a modified termination and terminal prior to attachment to the body.

The termination shown in FIG. 7 comprises a segment 34 provided with an integral terminal 56 similar to that shown in FIG. 5, except that the entire termination is made from copper and has no bimetallic commutator segment. In addition, the lug 42 is formed with a pressed dimple 44 instead of a tag. As shown, the distance A between the periphery of the segment support 12 and the lug recess 70 is greater than the distance B between the segment 34 and the lug 432. This and the engagement between the terminal 36 and the housing recess 26 holds the segment 34 in close abutment with the segment support 12. It is therefore possible to form the commutator segments 34 with a smaller radius of curvature than the segment support 12 so that the edges of the segment 34 engage the segment support 12 and thereby avoid steps in the cylindrical outer surface of the commutator.

Barbs 50 formed on the terminals 36 help lock the termination in place on the armature body. For a similar purpose, lug 42 has a compressible projection in the form of a dimple 44 so that the lug 42 has a thickness D which is greater than the width C of the lug recess 70.

In a preferred embodiment, for a commutator diameter of 5.3 mm and a segment thickness of 0.25 mm, there is a gap of 0.02 mm between the center of each segment 34 and the segment support 12 before the segment 34 is locked in place on the segment support 12. For dimensions B and C of about 0.5 mm, dimensions A and D are about 0.05 mm greater than dimension B and C, respectively.

Figure 8:
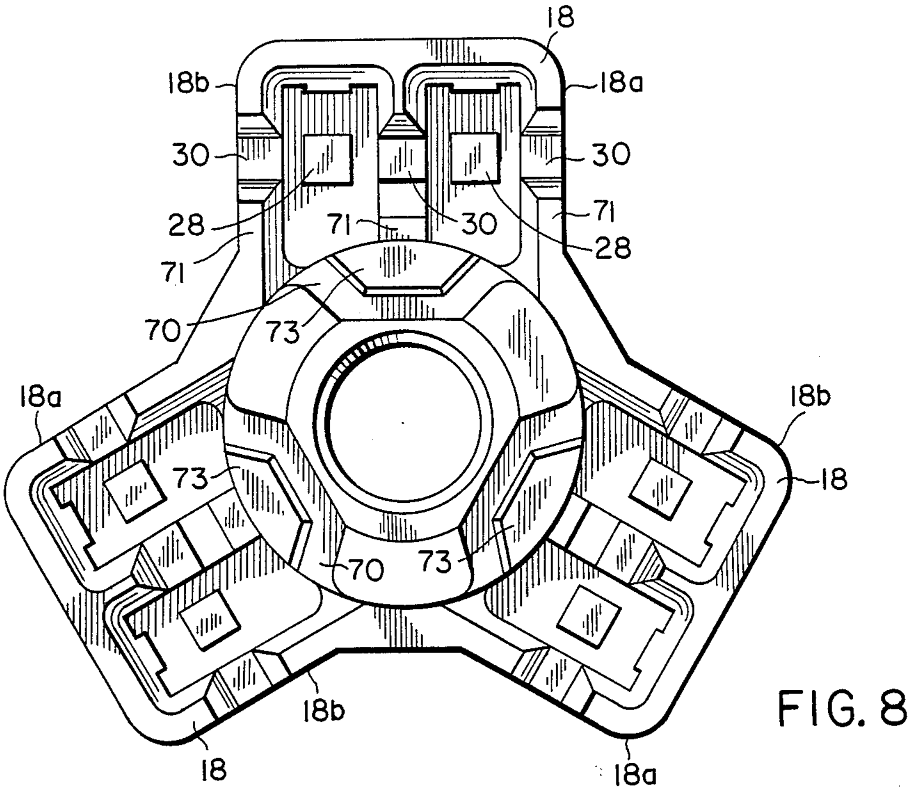
FIG. 8 is an end view of a further armature body provided with three equiangularly spaced housings.
Figure 9:
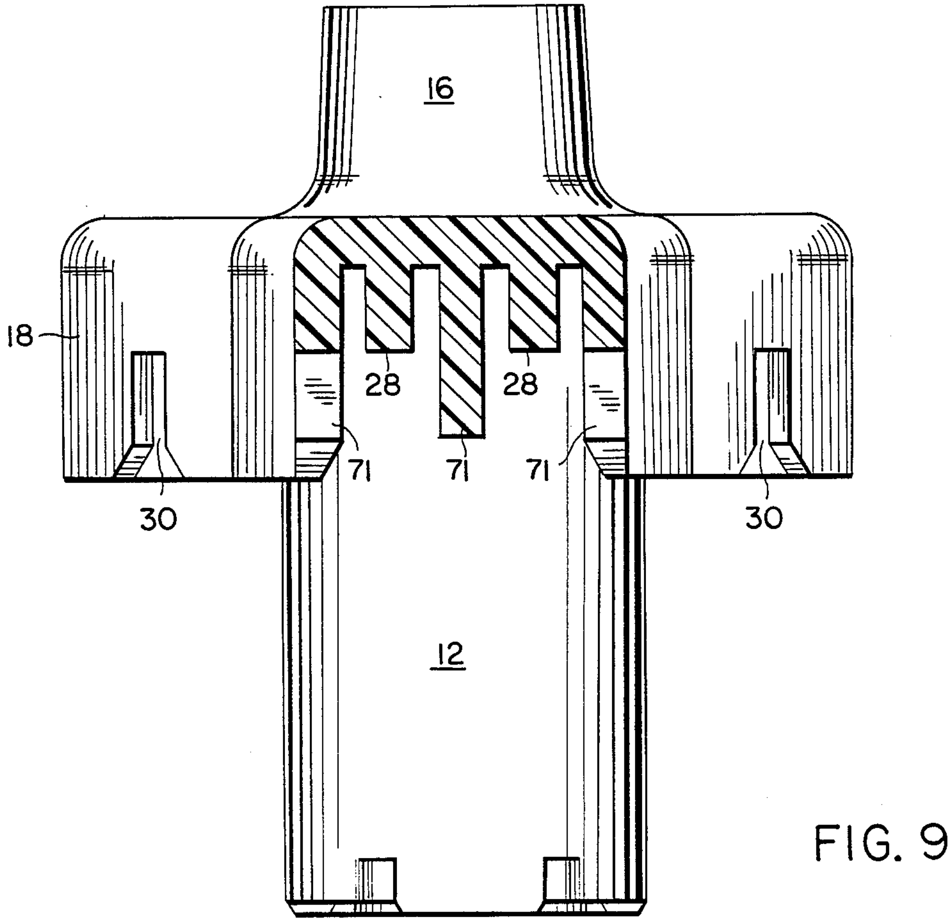
FIG. 9 is a part-sectional plan view of the armature body shown in FIG. 8.
Figure 10:
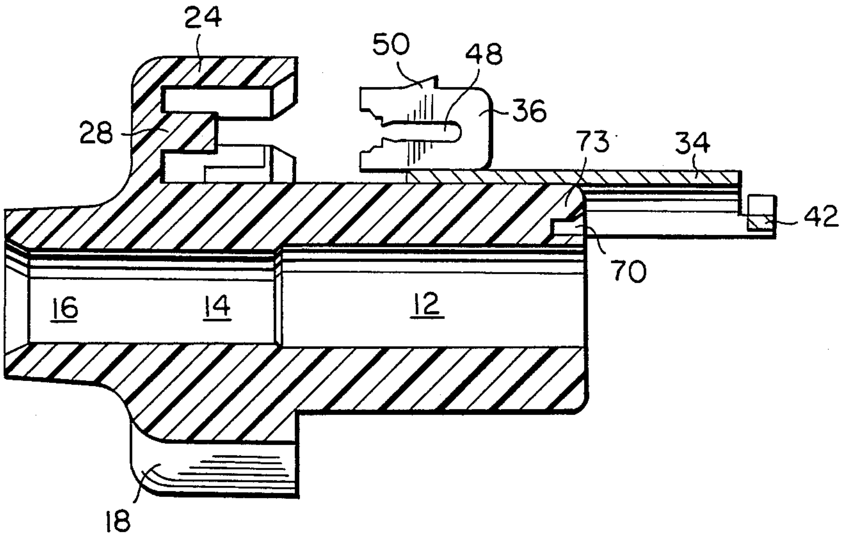
FIG. 10 is a sectional side view of the armature body shown in FIGS. 8 and 9 showing a modified termination and terminal prior to attachment to the body.

The armature body shown in FIGS. 8 through 10 has three housings 18 each having side faces 18*a* and 18*b* which act as a centrifugal cooling means, as previously described and each enclosing two bosses 28 and being formed with slot 30 in three walls 71 so as to define four slots 72 for accommodating a terminal 36 having four arms 52 as shown in FIGS. 11 through 14. As shown in FIGS. 8 through 10, each lug recess 70 is in the form of a groove around an axial projection 73 on a peripheral portion of the segment support 12.

In this case, the lug 42 for attaching the segment 34 to the segment support 12 is a strap which extends from spaced parts of the segment 34 and is seated in the lug recess or groove 70 around the axial projection 73. This form of construction is particularly suitable for larger diameter armature bodies 10 supporting only three commutator segments 34 because the straps 42 provide good anchorage of the segments 34 at spaced points away from the edges of the segments. Each lug 42 is inclined away from the segment 34 so as to facilitate entry into its lug recess 70.

Figure 11:
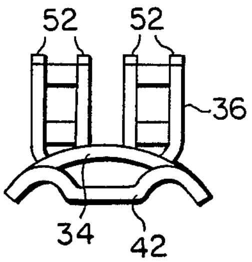
FIGS. 11 and 12 are end views of the modified termination shown in FIG. 10 respectively from the ends remote from and adjacent the terminal forming part of the termination.
Figure 12:
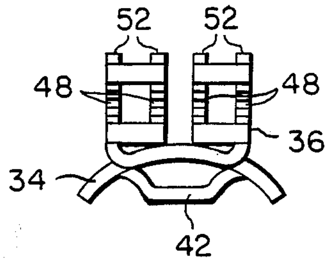
Figure 13:
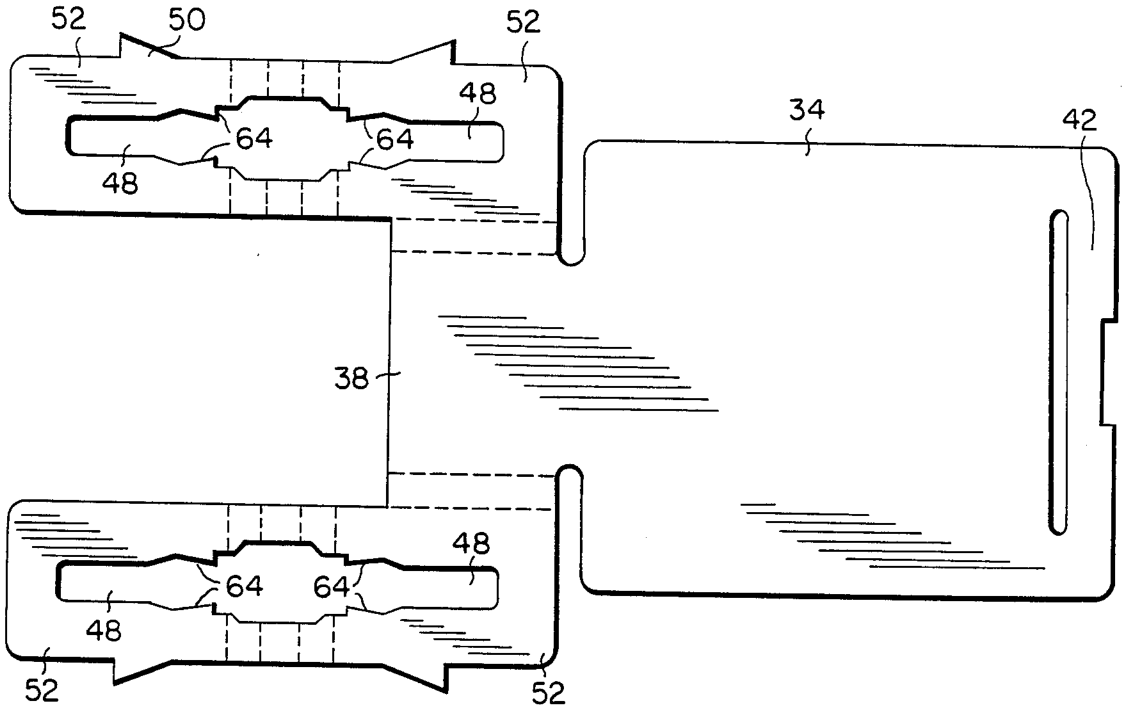
FIG. 13 is a blank of copper sheet from which the termination shown in FIGS. 10 to 12 is formed.
Figure 14:
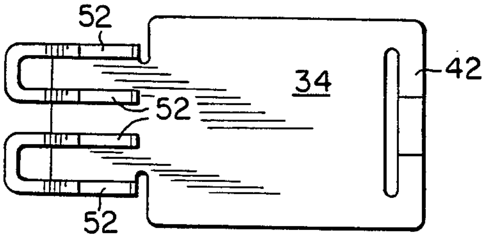
FIG. 14 is a plan view of the termination formed from the blank shown in FIG. 13.

As shown in FIGS. 11, 12, and 14, the terminal 36 is formed with four arms 52 and each has two cutting edges 64 and a slot 48 which straddles and grips at least one connected portion 32 of the armature winding. By this means, it is possible to form the entire termination from a single sheet of copper, in the form of a blank as shown in FIG. 13, which is relatively thin and yet still provides adequate electrical connection between the terminal 36 and the connected portion of 32 of the armature winding because of the number of connections between the terminal 36 and the connected portion 32.

Figure 15:
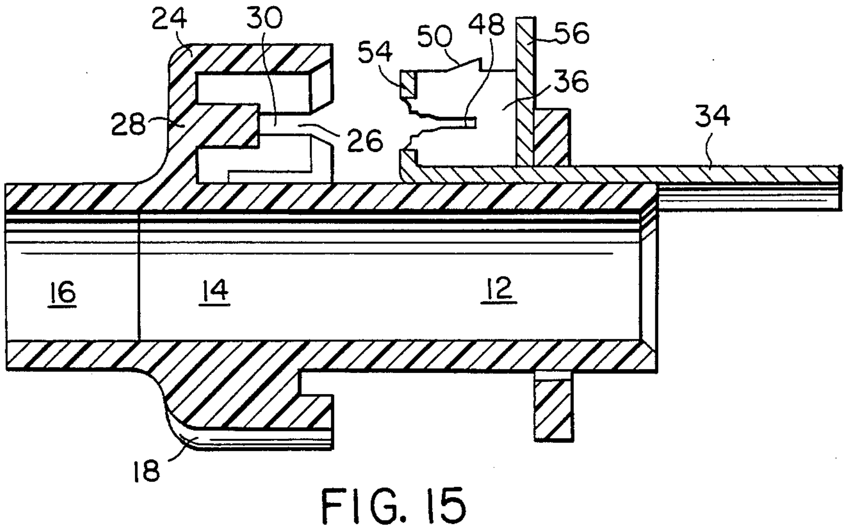
FIG. 15 is a sectional side view of an armature body similar to that of FIG. 5 showing another modified termination and terminal prior to attachment to the body.
Figure 16:
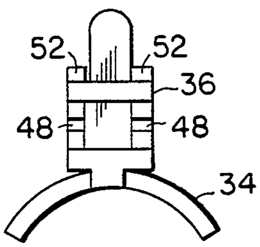
FIGS. 16 and 17 are end views of the modified termination shown in FIG. 15 from the ends adjacent and remote from the terminal forming part of the termination.
Figure 17:
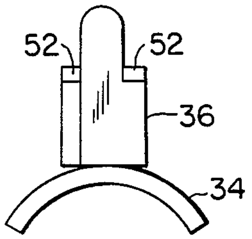

FIGS. 15 through 18 illustrate yet an additional embodiment for securing the combined commutator segment and terminal to the unitary plastic molded body 10. As shown in FIG. 15, the plastic body 10 is similar to that shown in FIG. 5 with the exception that the commutator support section 12 does not contain a longitudinal recess. As with the prior embodiments, like reference numerals denote like elements.

Figure 18:
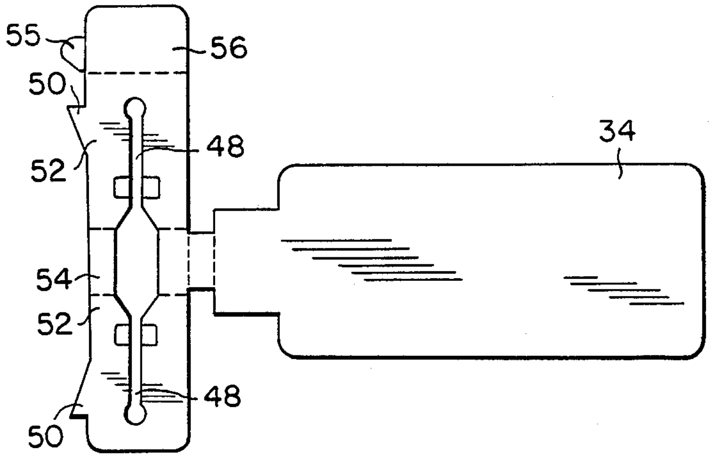
FIG. 18 is a blank of copper sheet from which the termination shown in FIGS. 16 and 17 is formed.

With reference to FIG. 18, the combined commutator segment 34 and terminal 36 are similar to the embodiment shown in FIG. 2. The FIG. 18 embodiment however, does not contain a lug and also is arranged so that the free end 56 is present at only one end of the terminal 36. By folding the sections of the terminal in a manner similar to that of FIG. 2, the structure shown in FIGS. 15 through 17 obtains.

The commutator segments 34 are placed on the supporting section 12 of body 10 and are slid along the section 12 so that the terminals 36 enter respective housings 18. Each terminal 36 is advanced within each housings 18 until the extreme end portion with its raised finger 55 contacts the open end of the housing. In order to secure all of the commutator segments in intimate contact with the outer surface of the commutator support section, a plastic ring 60 is provided. The interior circumferential surface of the ring is sized so that it secures the curved surfaces of the commutator segments in intimate contact with the outer cylindrical surface of the commutator support section 12.

With reference to FIG. 15, the barbs 50 grip the cover 24 of the housing 18 and retain the terminal 36 within the housing 18. Additional retention is provided by contact between the central portion 54 of the terminal 36 and the boss 28. The arms 52 of the terminal 36 can be bent at an angle slightly less than 90° from the central portion 54 so as to provide retention of the terminal 36 by action against the side wall 20 of the housing 18. Further retention may be provided if the width of the terminal 36 is a close fit to the internal dimension of the housing 18. These various means of retaining the terminal within the housing, coupled with the use of the ring to place the commutator segments in intimate contact with the commutator support section, provides an assembly which may be used for many applications in which very little thermal or mechanical stress is placed on the commutator such as is found in low powered motors.

Specific embodiments of the present invention have been described with reference to the accompanying drawings. Several modifications have been mentioned above and it will be readily apparent to a person skilled in the art that many further modifications of the details of the above embodiment are possible without departing from the scope of the present invention.

Features not mentioned above are that the commutator segments could be bonded to the support section 12 and that the spacer 16 may include formations cooperating with the complementary formations on the winding stacks, so as to prevent angular displacement between the body 10 and the armature stacks. The wire of the armature winding may be formed of a material such as aluminum instead of copper and various sizes of wire can be accommodated depending upon permissible deformation of the wire by the slots of the terminal arms 52.

Although the use of slots in the arms of 52 of the terminal 36 have been described it is possible to use other configurations of the terminal for effecting connection to the winding portion 32. This is particularly so for fine grade winding wires in which case a series of serrations replace the slots in the terminal arms 52.

What is claimed is:

1. An armature comprising winding means having a plurality of connector portions coated with insulation, a body having a commutator segment support and a housing section, and three or more commutator segments seated on said segment support and respectively connected to connector portions of said winding means, in which:

said housing section includes three or more housings which are respectively formed with housing recesses for said commutator segments and with means for positioning said connector portions of said winding relative to said housing recess;

each said commutator segment comprising an integral terminal disposed within one of said housing recesses and being in electrical contact with the connector portion therein;

said commutator segment support, said housing recess, said connector portions, and said terminals are arranged so that said each commutator segment can be positioned on said body with a single translational movement in which said commutator segment is moved relative to said segment support and, at the same time the integral terminal makes electrical contact with the connector portion positioned in said housing recess;

maintaining means for maintaining each of said commutator segments in intimate contact with said commutator segment support; and each housing defining radially extending surfaces which for at least one direction of rotation centrifuge air radially outwardly to cause air to be drawn over and cool the commutator segments.

2. An armature according to claim 1 wherein said projections define said surfaces to act as centrifugal cooling means for both directions of rotation.

3. An armature comprising a winding having connector portions coated with insulation, a body having a commutator segment support and a housing section, and three or more commutator segments seated on said segment support and respectively connected to connector portions of said winding means, in which:

said housing section includes three or more housings which are respectively formed with housing recesses for said commutator segments and with means for positioning said connector portions of said winding relative to each housing recess;

each said commutator segment comprising an integral terminal disposed within one of said housing recesses;

said terminal of each said commutator segment being provided with two cutting edges for cutting insulation on said connector portion positioned relative to said housing recess receiving said terminal, and a slot which straddles and grips aids connector portion positioned relative to said receiving housing recesses;

said commutator segment support, said housing recess, said connector portions, said terminals, said cutting edges and said slots are arranged so that saideach commutator segment can be positioned on said body with a single translational movement parallel to an axis of the slot in the terminal in which said commutator segment is moved relative to said segment support and, at the same time, said cutting eges strip said insulation from the connection portion positioned relative to said housing and said slot establishes and maintains electrical contact by insulation displacement;

maintaining means for maintaining each of said commutator segments in intimate contact with said commutator segment support; and each housing defining radially extending surfaces which for at least one direction of rotation centrifuge air radially outwardly to cause air to be drawn over and cool the commutator segments.

4. An armature in accordance with claim 3 wherein the terminal is formed with a plurality of arms each of which is provided with two cutting edges for cutting insulation on said connected portion positioned relative to said housing recess receiving said terminal, and a slot which straddles and grips said connected portion positioned relative to said receiving housing areas.

5. An armature in accordance with claim 4, wherein each slot has a first divergent portion extending from the two cutting edges, and a convergent portion extending from the divergent portion.

6. An armature in accordance with claim 3 wherein said terminal is provided with a barb for retaining said terminal and said connector portion in said housing recess.

7. An armature in accordance with claim 3 wherein said maintaining means comprises a lug one each of said commutator segments, said lug cooperates with a part of said armature which defines a lug recess so as to locate and retain said segment on said armature, in addition to said retention of said segment provided by said terminal.

8. An armature in accordance with claim 5 wherein said segment support is in the form of a cylinder and each lug recess provided in an end face of said cylinder.

9. An armature in accordance with claim 8 wherein the commutator segments are formed, initially, with a smaller radius of curvature than the commutator segment support and are held in abutment with the commutator segment support by means of the terminals seating in the housing recesses and the lugs seating in the lug recesses.

10. An armature in accordance with claim 9 wherein the distance between the periphery of the segment support and the lug recesses is greater than the distance between each segment and its lug and each lug is inclined away from the segments so as to facilitate entry into its lug recess

11. An armature in accordance with claim 10 wherein each lug is formed with a compressible projection which is initially thicker than the lug recess in which it is seated.

12. An armature in accordance with claim 3 wherein said body is of unitary construction and is molded from an insulating plastic material.

13. An armature in accordance with claim 3 wherein each of said terminals is comprised of bimetallic strip.

14. An armature in accordance with claim 3 wherein said body is provided with first guide means and each of said commutator segments is provided with second guide means cooperable with said first guide means and aligned parallel to said axis of said slot in said terminal of said respective commutator segment.

15. An armature in accordance with claim 14 wherein the lugs are in the form of straps connected at opposite ends to the segment and the lug recesses comprise grooves surrounding axial projections on the periphery of the segment support and which receive the straps.

16. An armature in accordance with claim 3 wherein said maintaining means comprises a ring encircling each of said commutator segments so as to locate and retain said segment on said armature, in addition to said retention of said segment provided by said terminal.

17. An armature in accordance with claim 16 wherein said segment support is in the form of a cylinder.

18. An armature in accordance with claim 17 wherein the commutator segments are formed, initially, with a smaller radius of curvature than the commutator segment support and are held in abutment with the commutator segment support by means of the terminals seating in the housing recesses and said ring encircling each of said commutator segments.

* * * * *